(12) United States Patent
Qu

(10) Patent No.: US 12,223,653 B2
(45) Date of Patent: Feb. 11, 2025

(54) PANORAMA RENDERING METHOD, ELECTRONIC DEVICE AND STORAGE MEDIUM

(71) Applicant: Beijing Baidu Netcom Science Technology Co., Ltd., Beijing (CN)

(72) Inventor: Da Qu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 345 days.

(21) Appl. No.: 17/685,055

(22) Filed: Mar. 2, 2022

(65) Prior Publication Data
US 2022/0189027 A1 Jun. 16, 2022

(30) Foreign Application Priority Data
Jun. 30, 2021 (CN) .......................... 202110736062.9

(51) Int. Cl.
*G06T 7/10* (2017.01)
*G06F 3/0346* (2013.01)

(52) U.S. Cl.
CPC .............. *G06T 7/10* (2017.01); *G06F 3/0346* (2013.01)

(58) Field of Classification Search
CPC ......... G06T 7/10; G06T 11/60; G06T 15/005; G06T 17/30; G06F 3/0346; G09G 5/34; G09G 2340/04; G09G 5/393; G09G 5/395
See application file for complete search history.

(56) References Cited

U.S. PATENT DOCUMENTS

| | | | | |
|---|---|---|---|---|
| 10,313,686 B2* | 6/2019 | Abbas | ................ | H04N 19/597 |
| 10,334,158 B2* | 6/2019 | Gove | ................ | H04N 23/651 |
| 10,582,201 B2* | 3/2020 | Wang | ................ | H04N 21/8146 |
| 10,726,593 B2* | 7/2020 | Holzer | ................ | H04N 13/111 |
| 10,911,732 B2* | 2/2021 | Kar | ................ | G06T 15/503 |
| 11,647,176 B2* | 5/2023 | Meng | ................ | G06T 7/73 348/47 |
| 2016/0328827 A1* | 11/2016 | Ilic | ................ | G06T 3/4038 |
| 2018/0012330 A1* | 1/2018 | Holzer | ................ | H04N 13/111 |
| 2018/0084257 A1* | 3/2018 | Abbas | ................ | H04N 19/176 |
| 2018/0308455 A1* | 10/2018 | Hicks | ................ | H04N 19/107 |

(Continued)

FOREIGN PATENT DOCUMENTS

WO   WO-2018099556 A1 *   6/2018   ........... G06T 3/0068

OTHER PUBLICATIONS

Liu Xianxiong, Hu Qingwu and Aimingyao, "Design and application of mobile panoramic map based on sphere model," 2015 23rd International Conference on Geoinformatics, Wuhan, China, 2015, pp. 1-5, doi: 10.1109/GEOINFORMATICS.2015.7378690. (Year: 2015).*

*Primary Examiner* — Mia M Thomas
(74) *Attorney, Agent, or Firm* — HSML P.C.

(57) ABSTRACT

A panorama rendering method, an electronic device and a storage medium are provided, and relates to the field of panoramic technology. The method includes: segmenting a panoramic picture to obtain segmented panoramic tile pictures; determining a target tile picture under a current screen and a target spherical patch in a panoramic picture sphere model, according to the panoramic picture sphere model and the segmented panoramic tile pictures; and pelfonning drawing on the target spherical patch by using the target tile picture, to obtain a target scene. In this way, time consumption of panorama loading can be reduced and loading performance can be improved.

14 Claims, 4 Drawing Sheets

(56) References Cited

U.S. PATENT DOCUMENTS

| | | | |
|---|---|---|---|
| 2019/0096139 A1* | 3/2019 | Chu | G06T 15/005 |
| 2019/0116322 A1* | 4/2019 | Holzer | G06T 7/75 |
| 2019/0268595 A1* | 8/2019 | Wang | H04N 19/88 |
| 2019/0379894 A1* | 12/2019 | Lim | H04N 19/463 |
| 2020/0014848 A1* | 1/2020 | Gove | H04N 23/661 |
| 2020/0074587 A1* | 3/2020 | Lee | G06T 15/10 |
| 2020/0092600 A1* | 3/2020 | Di | H04N 21/440245 |
| 2020/0228774 A1* | 7/2020 | Kar | H04N 13/111 |
| 2021/0193083 A1* | 6/2021 | Suzuoki | G09G 5/14 |
| 2021/0321072 A1* | 10/2021 | Oh | H04N 13/194 |
| 2022/0182595 A1* | 6/2022 | Han | H04N 5/262 |
| 2022/0279131 A1* | 9/2022 | Gong | H04N 23/695 |
| 2023/0017779 A1* | 1/2023 | Kavallierou | G09G 5/391 |
| 2023/0045606 A1* | 2/2023 | Lim | H04N 19/463 |
| 2023/0308599 A1* | 9/2023 | Heo | H04N 5/2628 |
| 2024/0048676 A1* | 2/2024 | Hu | H04N 13/158 |

\* cited by examiner

PANORAMA RENDERING METHOD, ELECTRONIC DEVICE AND STORAGE MEDIUM

CROSS-REFERENCE TO RELATED APPLICATION

This application claims priority to Chinese patent application No. 202110736062.9, filed on Jun. 30, 2021, which is hereby incorporated by reference in its entirety.

TECHNICAL FIELD

The present disclosure relates to the technical field of image processing, and in particular to the field of panoramic technology.

BACKGROUND

For a good browsing experience, a panoramic picture is generally a high-definition picture with an aspect ratio of 2:1, and usually has a resolution of 8192*4096.

SUMMARY

The present disclosure provides a panorama rendering method and apparatus, an electronic device, a medium and a program.

According to an aspect of the present disclosure, there is provided a panorama rendering method, which includes: segmenting a panoramic picture to obtain segmented panoramic tile pictures: determining a target tile picture under a current screen and a target spherical patch in a panoramic picture sphere model, according to the panoramic picture sphere model and the segmented panoramic tile pictures; and performing drawing on the target spherical patch by using the target tile picture, to obtain a target scene.

According to another aspect of the present disclosure, there is provided an electronic device, which includes:
  at least one processor; and
  a memory communicatively connected with the at least one processor, wherein
  the memory stores instructions executable by the at least one processor, and the instructions, when executed by the at least one processor, enable the at least one processor to perform the method in any one of embodiments of the present disclosure.

According to another aspect of the present disclosure, there is provided a non-transitory computer-readable storage medium storing computer instructions, wherein the computer instructions, when executed by a computer, cause the computer to perform the method in any one of the embodiments of the present disclosure.

It should be understood that the content described in this section is not intended to limit the key or important features of the embodiments of the present disclosure, nor is it intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure, wherein.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

In the present disclosure, a panoramic picture refers to a 360° picture projected onto a two-dimensional plane. Due to a relatively large resource of the panoramic picture, loading the panoramic picture not only takes a long time, but also easily causes rendering lag. In order to solve the above problem, the present disclosure provides a new panorama rendering method.

Figure 1:
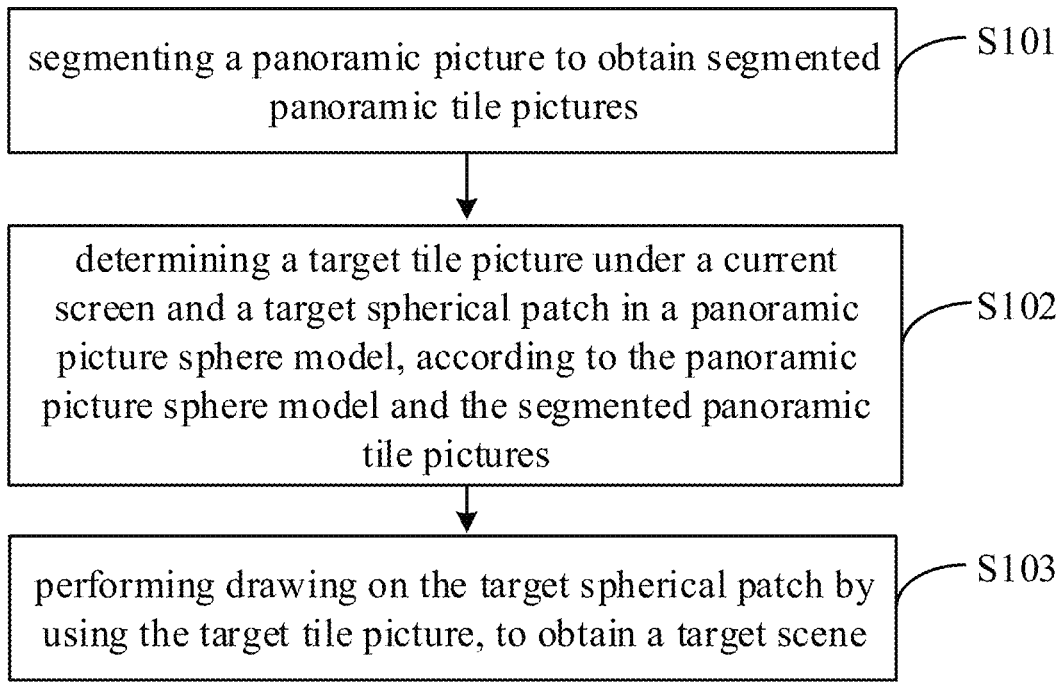
FIG. 1 is a flowchart of a panorama rendering method according to an embodiment of the present disclosure.

Referring to FIG. 1, FIG. 1 shows a panorama rendering method according to an exemplary embodiment of the present disclosure. The specific process includes:

S101: segmenting a panoramic picture to obtain segmented panoramic tile pictures:

S102: determining a target tile picture under a current screen and a target spherical patch in a panoramic picture sphere model, according to the panoramic picture sphere model and the segmented panoramic tile pictures; and

S103: performing drawing on the target spherical patch by using the target tile picture, to obtain a target scene.

Therefore, the panorama rendering method of the present disclosure performs segmentation processing on the panoramic picture, can realize on-demand loading of the current screen, and significantly improves the response speed and optimizes the panorama display performance, which not only guarantees the loading speed but also guarantees the on-demand rendering, thereby improving the loading experience.

In a possible implementation, the panoramic picture sphere model is a sphere composed of a plurality of spherical patches. Optionally, the number of spherical patches can be 128, wherein there are 16 surfaces in a horizontal direction and 8 surfaces in a vertical direction.

In the present disclosure, a panoramic picture sphere model is established in advance. Since the panoramic picture sphere model includes a plurality of spherical patches, it is possible to realize a correspondence between the panoramic tile pictures and the spherical patches, and provide a basis for realizing on-demand loading under the current screen.

Figure 2:
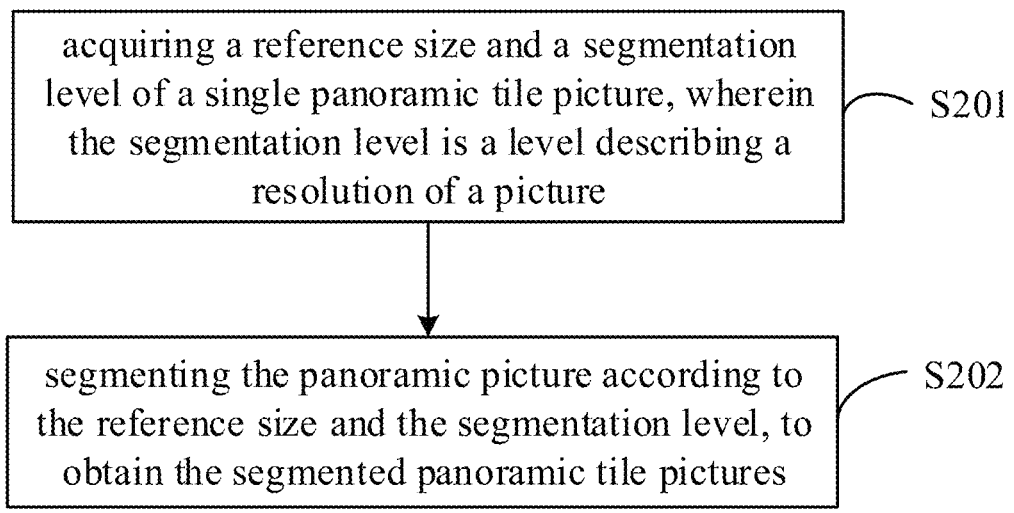
FIG. 2 is a flowchart of segmenting a panoramic picture according to an embodiment of the present disclosure.

In a possible implementation, in S101, referring to FIG. 2, the segmenting the panoramic picture may specifically include:

S201: acquiring a reference size and a segmentation level of a single panoramic tile picture, wherein the segmentation level is a level describing a resolution of a picture; and S202: segmenting the panoramic picture according to the reference size and the segmentation level, to obtain the segmented panoramic tile pictures.

In a possible implementation, the reference size of a single panoramic tile picture in the present disclosure is 512*512, and correspondingly, the segmentation level includes 5 levels. Specifically, a 1-level resolution corresponds to 512*256, including 1 panoramic tile thumbnail; a 2-level resolution corresponds to 1024*512, including 2*1 panoramic tile pictures; a 3-level resolution corresponds to 2048*1024, including 4*2 panoramic tile pictures; a 4-level resolution corresponds to 4096*2048, including 8*4 panoramic tile pictures; and a 5-level resolution corresponds to 8192*4096, including 16*8 panoramic tile pictures. Herein, a 1-level picture is defined as a thumbnail of an original picture, is composed of a 512*256 picture, and serves as the bottom background of a target scene, which can speed up the time for a user to see the target scene. Since the panoramic picture is segmented into a plurality of panoramic tile pictures, this provides a basis for realizing on-demand loading of the current screen and can reduce the GPU overhead.

It can be seen that the number of panoramic tile pictures corresponding to a 5-level picture is the same as the number of spherical patches of the panoramic picture sphere model, both are 128, which can achieve a one-to-one correspondence. That is, a 5-level panoramic tile picture corresponds to 1 spherical patch, and a 4-level panoramic tile picture corresponds to 4 spherical patches.

In the present disclosure, a plurality of panoramic tile pictures are obtained after a panoramic picture is segmented. In order to facilitate subsequent loading, the segmented panoramic tile pictures are numbered, usually using level (zoom)+row number (x)+column number (y) for identification.

The reference size and segmentation level of the above single panoramic tile picture are only an exemplary design. Of course, other suitable sizes can also be designed, as long as the panoramic picture can be segmented according to the reference size and segmentation level. The present disclosure does not specifically limit this.

Figure 3:
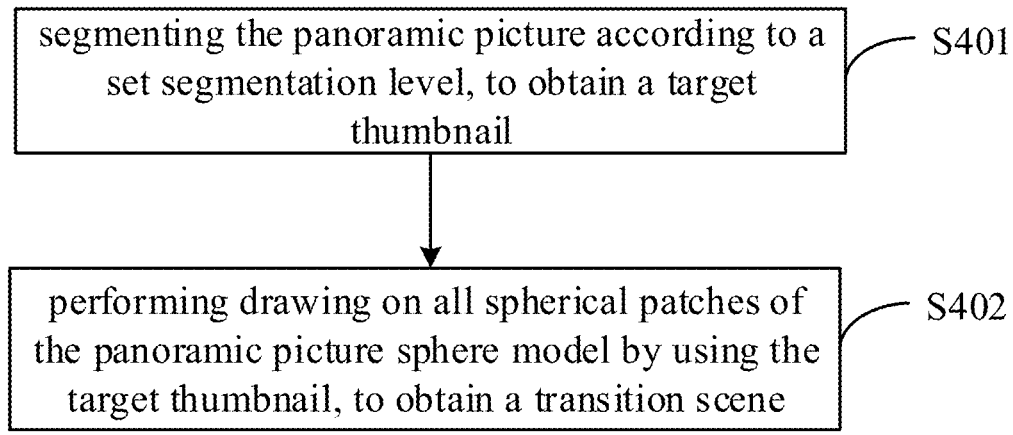
FIG. 3 is a rendering flowchart of a transition scene according to an embodiment of the present disclosure.

In a possible implementation, before S103 is performed, referring to FIG. 3, the method further includes:

S401: segmenting the panoramic picture according to a set segmentation level, to obtain a target thumbnail; and S402: performing drawing on all spherical patches of the panoramic picture sphere model by using the target thumbnail, to obtain a transition scene.

The segmentation level set in S401 can be set to level 1, optionally, it can also be set to level 2. However, the lower the set level is, the shorter the loading time is and the faster the rendering speed is.

Through the above process, the user sees a relatively fuzzy panoramic scene. The advantage of this is that the loading time of the panoramic scene is short, the rendering speed is fast, and the user's waiting time can be effectively shortened. The following steps render high-definition texture resources on demand on the basis of the transition scene.

It should be noted that S401 is performed after S101 and before S102.

Figure 4:
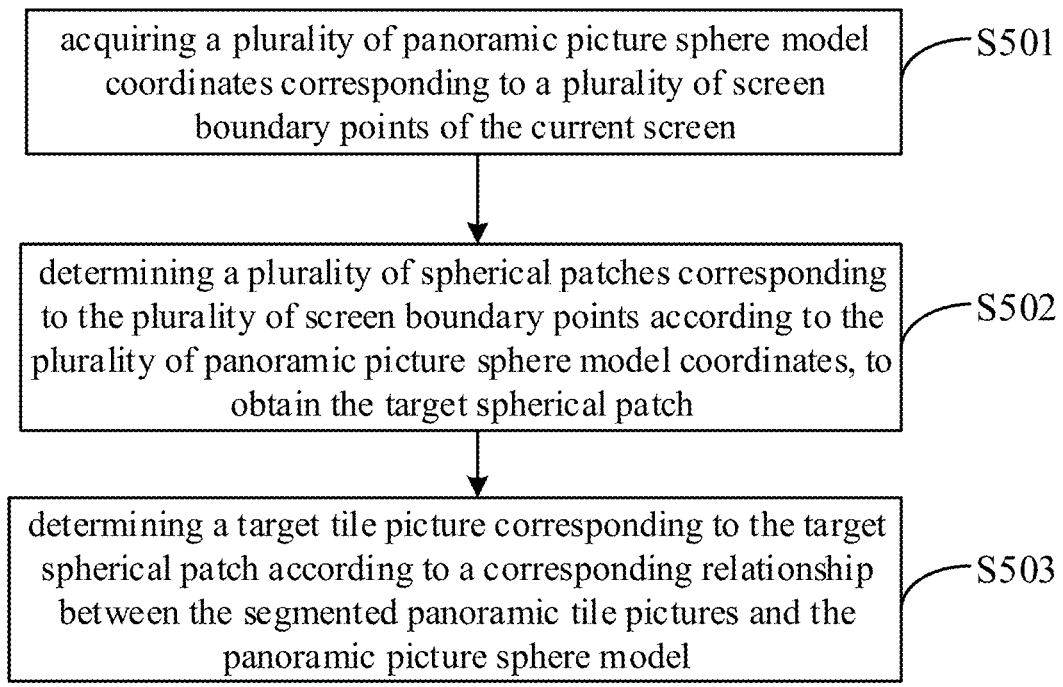
FIG. 4 is a flowchart of determining a target tile picture and a target spherical patch according to an embodiment of the present disclosure.

In a possible implementation, in S102, referring to FIG. 4, the determining the target tile picture and the target spherical patch may specifically include:

S501: acquiring a plurality of panoramic picture sphere model coordinates corresponding to a plurality of screen boundary points of the current screen;

S502: determining a plurality of spherical patches corresponding to the plurality of screen boundary points according to the plurality of panoramic picture sphere model coordinates, to obtain the target spherical patch; and S503: determining a target tile picture corresponding to the target spherical patch according to a corresponding relationship between the segmented panoramic tile pictures and the panoramic picture sphere model.

In a possible implementation, in the present disclosure, a total of 8 points at four corners of the screen and midpoints of four sides of the screen are taken as the screen boundary points, and panoramic picture sphere model coordinates P corresponding to each screen boundary point are calculated. Optionally, 2D coordinates of a screen boundary point are acquired and converted into 3D coordinates of the panoramic picture sphere model by using the existing technology.

In the present disclosure, the number of target tile pictures is determined to be multiple. In a possible implementation, a plurality of target tile pictures are obtained in S503. In a case where 5-level segmentation is used, the serial numbers of 8 target tile pictures can be obtained, such that ranges of rows and columns of the target tile pictures that need to be loaded currently can be determined. That is, a set of target tile pictures that needs to be loaded under the current screen can be obtained.

Through the above process, it is possible to determine the set of target tile pictures that need to be loaded under the current screen and the target spherical patches corresponding to the set of target tile pictures, thereby providing a basis for realizing the loading of high-definition textures.

Figure 5:
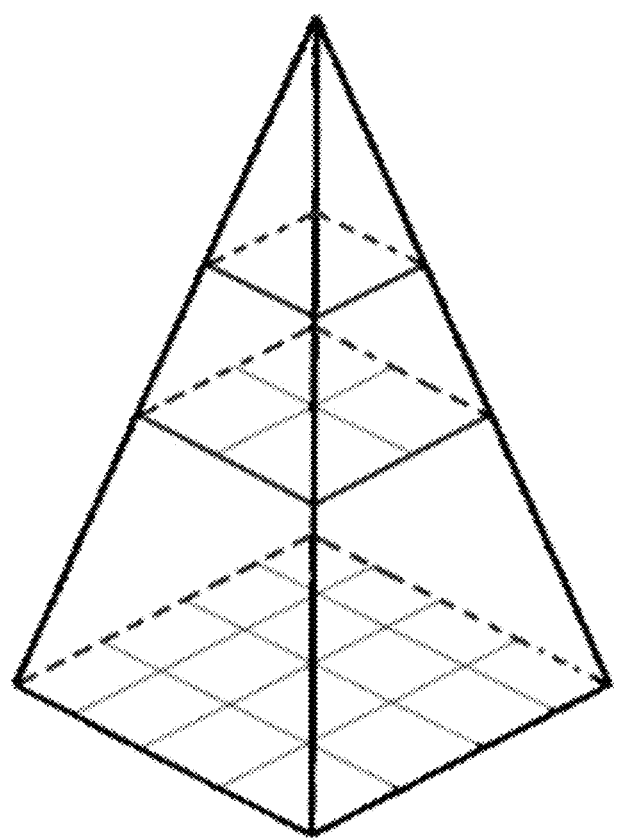
FIG. 5 is a quadtree-like structure diagram based on panoramic tile pictures and a panoramic picture sphere model according to an embodiment of the present disclosure.

In S503, i.e., determining the target tile picture corresponding to the target spherical patch according to the corresponding relationship between the segmented panoramic tile pictures and the panoramic picture sphere model, because the number of spherical patches of the panoramic picture sphere model is the same as the number of panoramic tile pictures corresponding to a 5-level picture, in a case where a picture below level 5 is loaded, there will be a situation where the tile texture of a panoramic tile picture corresponds to a plurality of spherical patches, for example, a 4-level panoramic tile picture corresponds to 4 spherical patches. In this regard, the present disclosure can construct a quadtree-like structure to quickly find the corresponding relationship between the panoramic tile pictures and the spherical patches of the panoramic picture sphere model. As shown in FIG. 5, compared with an existing solution that it needs to perform drawing on all spherical patches each time, the present disclosure can render the tile texture under the current screen and the corresponding spherical patch model on demand according to the corresponding relationship between the panoramic tile pictures and the spherical patches, thereby realizing efficient rendering.

In a possible implementation, in a case where the movement or rotation of the current screen is detected, the target scene is updated.

For example, in a case where the screen is moved or a zooming operation is performed on the screen, the method is returned to S102 to continue the drawing process of the target scene.

In a possible implementation, during a loading process from the transition scene to the target scene, an animation with gradual transparency is added to make a display process from blur to high definition smoother, which can effectively improve the user experience.

Figure 6:
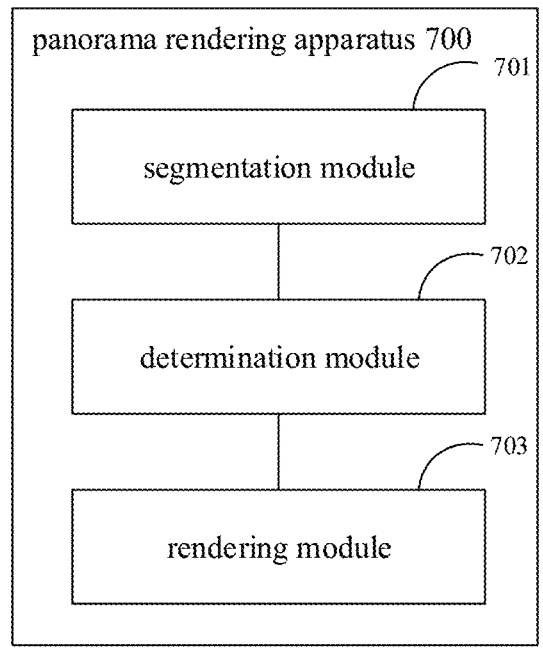
FIG. 6 is a block diagram of a panorama rendering apparatus according to an embodiment of the present disclosure.

Refer to FIG. 6, FIG. 6 shows a panorama rendering apparatus according to an embodiment of the present disclosure. The apparatus 700 includes:

- a segmentation module 701 configured for segmenting a panoramic picture to obtain segmented panoramic tile pictures:
- a determination module 702 configured for determining a target tile picture under a current screen and a target spherical patch in a panoramic picture sphere model, according to the panoramic picture sphere model and the segmented panoramic tile pictures; and
- a rendering module 703 configured for performing drawing on the target spherical patch by using the target tile picture, to obtain a target scene.

In a possible implementation, the panoramic picture sphere model is a sphere composed of a plurality of spherical patches.

In a possible implementation, the segmentation module 701 includes:

- an information acquisition submodule configured for acquiring a reference size and a segmentation level of a single panoramic tile picture, wherein the segmentation level is a level describing a resolution of a picture; and
- a picture segmenting submodule configured for segmenting the panoramic picture according to the reference size and the segmentation level, to obtain the segmented panoramic tile pictures.

In a possible implementation, the apparatus 700 further includes a transition rendering module configured for:

- before the rendering module performs drawing on the target spherical patch by using the target tile picture, to obtain the target scene, segmenting the panoramic picture according to a set segmentation level, to obtain a target thumbnail; and
- performing drawing on all spherical patches of the panoramic picture sphere model by using the target thumbnail, to obtain a transition scene.

In a possible implementation, the determination module 702 includes:

- a sphere model coordinate acquisition submodule configured for acquiring a plurality of panoramic picture sphere model coordinates corresponding to a plurality of screen boundary points of the current screen:
- a target spherical patch determination submodule configured for determining a plurality of spherical patches corresponding to the plurality of screen boundary points according to the plurality of panoramic picture sphere model coordinates, to obtain the target spherical patch; and
- a target tile picture determination submodule configured for determining a target tile picture corresponding to the target spherical patch according to a corresponding relationship between the segmented panoramic tile pictures and the panoramic picture sphere model.

In a possible implementation, the apparatus 700 further includes an updating module configured for:

updating the target scene in response to detection of a movement or rotation of the current screen.

The functions of respective units, modules or submodules in respective apparatuses of the embodiments of the present disclosure may refer to corresponding descriptions of the above method embodiments, and will not be described in detail herein.

In the technical solution of the present disclosure, the acquisition, storage, application and the like of the user's personal information involved all comply with relevant laws and regulations, and do not violate public order and good customs.

According to embodiments of the present disclosure, the present disclosure also provides an electronic device, a readable storage medium and a computer program product.

Figure 7:
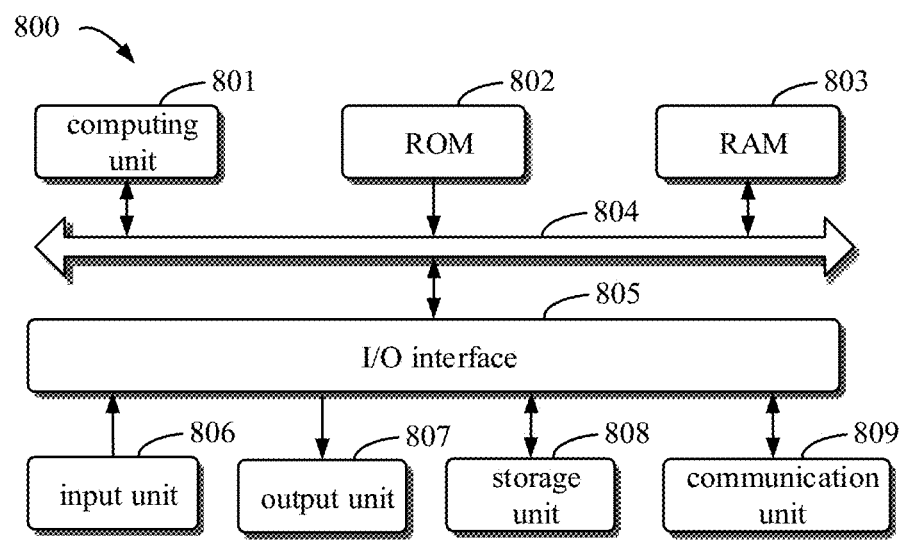
FIG. 7 is a block diagram of an electronic device for implementing a panorama rendering method according to an embodiment of the present disclosure.

FIG. 7 shows a schematic block diagram of an example electronic device 800 that may be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 7, the electronic device 800 includes a computing unit 801 that may perform various suitable actions and processes in accordance with computer programs stored in a read only memory (ROM) 802 or computer programs loaded from a storage unit 808 into a random access memory (RAM) 803. In the RAM 803, various programs and data required for the operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, including: an input unit 806, such as a keyboard, a mouse, etc.: an output unit 807, such as various types of displays, speakers, etc.: a storage unit 808, such as a magnetic disk, an optical disk, etc.; and a communication unit 809, such as a network card, a modem, a wireless communication transceiver, etc. The communication unit 809 allows the electronic device 800 to exchange information/data with other devices over a computer network, such as the Internet, and/or various telecommunications networks.

The computing unit 801 may be various general purpose and/or special purpose processing assemblies having processing and computing capabilities. Some examples of the computing unit 801 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 801 performs various methods and processes described above, such as the above panorama rendering method. For example, in some embodiments, the above panorama rendering method may be implemented as computer software programs that are physically contained in a machine-readable medium, such as the storage unit 808. In some embodiments, some or all of the computer programs may be loaded into and/or installed on the electronic device 800 via the ROM 802 and/or the communication unit 809. In a case where the computer programs are loaded into the RAM 803 and executed by the computing unit 801, one or more of steps of the above panorama rendering method may be performed. Alternatively, in other embodiments, the computing unit 801 may be configured to perform the above panorama rendering method in any other suitable manner (e.g., by means of a firmware).

Various embodiments of the systems and techniques described herein above may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, a firmware, a software, and/or a combination thereof. These various implementations may include an implementation in one or more computer programs, which can be executed and/or interpreted on a programmable system including at least one programmable processor: the programmable processor may be a dedicated or general-purpose programmable processor and capable of receiving and transmitting data and instructions from and to a storage system, at least one input device, and at least one output device.

The program codes for implementing the methods of the present disclosure may be written in any combination of one or more programming languages. These program codes may be provided to a processor or controller of a general purpose computer, a special purpose computer, or other programmable data processing apparatus such that the program codes, when executed by the processor or controller, enable the functions/operations specified in the flowchart and/or the block diagram to be performed. The program codes may be executed entirely on a machine, partly on a machine, partly on a machine as a stand-alone software package and partly on a remote machine, or entirely on a remote machine or server.

In the context of the present disclosure, the machine-readable medium may be a tangible medium that may contain or store programs for using by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium may include one or more wire-based electrical connection, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide an interaction with a user, the system and technology described here may be implemented on a computer having: a display device (e.g., a cathode ray tube (CRT) or a liquid crystal display (LCD) monitor) for displaying information to the user; and a key board and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, and the server may also be a server of a distributed system, or a server combining a blockchain.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A panorama rendering method, comprising:
   segmenting a panoramic picture to obtain segmented panoramic tile pictures;
   determining a target tile picture under a current screen and a target spherical patch in a panoramic picture sphere model, according to the panoramic picture sphere model and the segmented panoramic tile pictures; and
   performing drawing on the target spherical patch by using the target tile picture, to obtain a target scene,
   wherein the panoramic picture sphere model is a sphere composed of a plurality of spherical patches,
   wherein the segmenting the panoramic picture to obtain the segmented panoramic tile pictures, comprises:
   acquiring a reference size and a segmentation level of a single panoramic tile picture, wherein the segmentation level is a level describing a resolution of a picture; and
   segmenting the panoramic picture according to the reference size and the segmentation level, to obtain the segmented panoramic tile pictures.

2. The method of claim 1, wherein before performing drawing on the target spherical patch by using the target tile picture, to obtain the target scene, the method further comprises:
segmenting the panoramic picture according to a set segmentation level, to obtain a target thumbnail; and
performing drawing on all spherical patches of the panoranlle panoramic picture sphere model by using the target thumbnail, to obtain a transition scene.

3. The method of claim 2, wherein the determining the target tile picture under the current screen and the target spherical patch in the panoramic picture sphere model, according to the panoramic picture sphere model and the segmented panoramic tile pictures, comprises:
acquiring a plurality of panoramic picture sphere model coordinates corresponding to a plurality of screen boundary points of the current screen;
determining a plurality of spherical patches corresponding to the plurality of screen boundary points according to the plurality of panoramic picture sphere model coordinates, to obtain the target spherical patch; and
determining a target tile picture corresponding to the target spherical patch according to a corresponding relationship between the segmented panoramic tile pictures and the panoramic picture sphere model.

4. The method of claim 1, wherein the determining the target tile picture under the current screen and the target spherical patch in the panoramic picture sphere model, according to the panoramic picture sphere model and the segmented panoramic tile pictures, comprises:
acquiring a plurality of panoramic picture sphere model coordinates corresponding to a plurality of screen boundary points of the current screen;
determining a plurality of spherical patches corresponding to the plurality of screen boundary points according to the plurality of panoramic picture sphere model coordinates, to obtain the target spherical patch; and
determining a target tile picture corresponding to the target spherical patch according to a corresponding relationship between the segmented panoramic tile pictures and the panoramic picture sphere model.

5. The method of claim 1, further comprising: updating the target scene in response to detection of a movement or rotation of the current screen.

6. An electronic device, comprising:
at least one processor; and
a memory communicatively connected with the at least one processor, wherein the memory stores instructions executable by the at least one processor, and the instructions, when executed by the at least one processor, enable the at least one processor to perform operations of:
segmenting a panoramic picture to obtain segmented panoramic tile pictures;
determining a target tile picture under a current screen and a target spherical patch in a panoramic picture sphere model, according to the panoramic picture sphere model and the segmented panoramic tile pictures; and
performing drawing on the target spherical patch by using the target tile picture, to obtain a target scene,
wherein the panoramic picture sphere model is a sphere composed of a plurality of spherical patches,
wherein the segmenting the panoramic picture to obtain the segmented panoramic tile pictures, comprises:
acquiring a reference size and a segmentation level of a single panoramic tile picture, wherein the segmentation level is a level describing a resolution of a picture; and
segmenting the panoramic picture according to the reference size and the segmentation level, to obtain the segmented panoramic tile pictures.

7. The electronic device of claim 6, wherein the instructions, when executed by the at least one processor, enable the at least one processor to further perform operations of:
before performing drawing on the target spherical patch by using the target tile picture, to obtain the target scene,
segmenting the panoramic picture according to a set segmentation level, to obtain a target thumbnail; and
performing drawing on all spherical patches of the panoramic picture sphere model by using the target thumbnail, to obtain a transition scene.

8. The electronic device of claim 6, wherein the determining the target tile picture under the current screen and the target spherical patch in the panoramic picture sphere model, according to the panoramic picture sphere model and the segmented panoramic tile pictures, comprises:
acquiring a plurality of panoramic picture sphere model coordinates cones ponding to a plurality of screen boundary points of the current screen;
determining a plurality of spherical patches corresponding to the plurality of screen boundary points according to the plurality of panoramic picture sphere model coordinates, to obtain the target spherical patch; and
determining a target tile picture corresponding to the target spherical patch according to a corresponding relationship between the segmented panoramic tile pictures and the panoramic picture sphere model.

9. The electronic device of claim 7, wherein the determining the target tile picture under the current screen and the target spherical patch in the panoramic picture sphere model, according to the panoramic picture sphere model and the segmented panoramic tile pictures, comprises:
acquiring a plurality of panoramic picture sphere model coordinates corresponding to a plurality of screen boundary points of the current screen;
determining a plurality of spherical patches corresponding to the plurality of screen boundary points according to the plurality of panoramic picture sphere model coordinates, to obtain the target spherical patch; and
determining a target tile picture corresponding to the target spherical patch according to a corresponding relationship between the segmented panoramic tile pictures and the panoramic picture sphere model.

10. The electronic device of claim 6, wherein the instructions, when executed by the at least one processor, enable the at least one processor to further perform an operation of:
updating the target scene in response to detection of a movement or rotation of the current screen.

11. A non-transitory computer-readable storage medium storing computer instructions, wherein the computer instructions, when executed by a computer, cause the computer to perform operations of:
segmenting a panoramic picture to obtain segmented panoramic tile pictures;
determining a target tile picture under a current screen and a target spherical patch in a panoramic picture sphere model, according to the panoramic picture sphere model and the segmented panoramic tile pictures; and performing drawing on the target spherical patch by using the target tile picture, to obtain a target scene, wherein the panoramic picture sphere model is a sphere composed of a plurality of spherical patches, wherein the segmenting the panoramic picture to obtain the segmented panoramic tile pictures, comprises:

acquiring a reference size and a segmentation level of a single panoramic tile picture, wherein the segmentation level is a level describing a resolution of a picture; and segmenting the panoramic picture according to the reference size and the segmentation level, to obtain the segmented panoramic tile pictures.

12. The non-transitory computer-readable storage medium of claim 11, wherein the computer instructions, when executed by the computer, cause the computer to further perform operations of:

before performing drawing on the target spherical patch by using the target tile picture, to obtain the target scene, segmenting the panoramic picture according to a set segmentation level, to obtain a target thumbnail; and performing drawing on all spherical patches of the panoramic picture sphere model by using the target thumbnail, to obtain a transition scene.

13. The non-transitory computer-readable storage medium of claim 11, wherein the determining the target tile picture under the current screen and the target spherical patch in the panoramic picture sphere model, according to the panoramic picture sphere model and the segmented panoramic tile pictures, comprises:

acquiring a plurality of panoramic picture sphere model coordinates corresponding to a plurality of screen boundary points of the current screen;

determining a plurality of spherical patches corresponding to the plurality of screen boundary points according to the plurality of panoramic picture sphere model coordinates, to obtain the target spherical patch; and determining a target tile picture corresponding to the target spherical patch according to a corresponding relationship between the segmented panoramic tile pictures and the picture sphere model.

14. The non-transitory computer-readable storage medium of claim 11, wherein the computer instructions, when executed by the computer, cause the computer to further perform an operation of:

updating the target scene in response to detection of a movement or rotation of the current screen.

* * * * *